United States Patent [19]

Hofstetter

[11] Patent Number: 4,993,886
[45] Date of Patent: Feb. 19, 1991

[54] AIR REGULATING UNIT, PROCESS FOR REGULATING AIR FLOW, AND USE OF A LIFTING BODY IN SUCH A SYSTEM

[75] Inventor: Hans Hofstetter, Gossau, Switzerland

[73] Assignee: Buehler AG, Uzwil, Switzerland

[21] Appl. No.: 335,083

[22] PCT Filed: Jun. 24, 1988

[86] PCT. No.: EP88/00559
 § 371 Date: Apr. 21, 1989
 § 102(e) Date: Apr. 21, 1989

[87] PCT Pub. No.: WO89/00141
 PCT Pub. Date: Jan. 12, 1989

[30] Foreign Application Priority Data

Jul. 1, 1987 [CH] Switzerland ............ 02478/87

[51] Int. Cl.$^5$ ............................................. B65G 53/34
[52] U.S. Cl. ............................. 406/192; 406/14; 137/521; 98/121.2
[58] Field of Search ............. 406/192, 14, 151, 173, 406/155; 137/521, 519; 251/338, 336; 98/121.2

[56] References Cited

U.S. PATENT DOCUMENTS

| 949,009 | 2/1910 | Smith | 137/519 |
|---|---|---|---|
| 1,162,239 | 11/1915 | Johnsgaard | 137/519 |
| 2,263,980 | 11/1941 | Carlson | 137/521 |
| 2,279,425 | 4/1942 | Voysey | 98/110 X |
| 3,771,559 | 11/1973 | Alley | 98/121.2 X |
| 4,301,833 | 11/1981 | Donald, III | 137/521 |
| 4,488,575 | 12/1984 | Haaz et al. | 137/521 X |

FOREIGN PATENT DOCUMENTS

| 811578 | 6/1951 | Fed. Rep. of Germany | 406/14 |
|---|---|---|---|
| 1115830 | 4/1956 | France | 406/14 |
| 181625 | 7/1989 | Japan | 406/14 |
| 698872 | 11/1979 | U.S.S.R. | 406/14 |
| 732844 | 6/1955 | United Kingdom | 406/192 |

Primary Examiner—Joseph F. Peters, Jr.
Assistant Examiner—James M. Kannofsky
Attorney, Agent, or Firm—Darby & Darby

[57] ABSTRACT

The new invention concerns the regulation of air volume in a conveying system comprising an air collecting line (37) in which the air volume and the corresponding air velocity, respectively, is regulated in the individual conveying pipelines (30-36) by a lifting body (4) resembling an airfoil. The latter works like a throttle flap and moves from an incidence angle ($\alpha$, $\beta$) of at least 10 degrees in the completely open position to 90 degrees in the closed position as a result of the lifting moments acting on it. The lifting body (4) itself regulates the air volume by means of blocking the air line cross section to a greater or lesser extent, wherein a balance is adjusted in every case between the air forces and lifting moments, respectively, which act at the lifting body (4) so as to be directed in a closing position and a counterweight (5) or countertorque, respectively, acting at the lifting body (4) in the opening direction. A responsiveness which has not been previously achieved can accordingly be achieved from every position and an optimal regulating characteristic, e.g. at an approximately constant air velocity, can accordingly be achieved independently of the air resistance occurring prior to the regulating unit.

6 Claims, 3 Drawing Sheets

AIR REGULATING UNIT, PROCESS FOR REGULATING AIR FLOW, AND USE OF A LIFTING BODY IN SUCH A SYSTEM

The invention is directed to a pneumatic conveying system with a ventilator or blower, one or more pneumatic conveying lines and an air volume control.

The higher the degree of automation striven for in an industrial system, the more important the demand for operating reliability of the individual elements of the system. This is not only general practice of recent industrial development, but, rather, is already a constant of the imperatives of the system builder. In theory at least, the operating reliability can be augmented in two ways. The first is the increased use of computer intelligence not only in a central control unit, but particularly also as localized intelligence in the individual machines and devices.

A beginning to the solution for mastering the range of problems upon which the present invention is based is described in the DE-PS 3 128 807. The basic problem has already been known for a long time in connection with pneumatic systems in mills. In this case, a plurality of parallel conveying pipes are connected to a mutual ventilator or blower. The air volumes of the individual conveying pipes accordingly exhibit a mutual dependence. For example, as soon as the volume of conveyed material is reduced in an individual conveying pipe or in a part of the conveying pipe, the air volume in this pipe is increased as a result of the absence of conveying line resistance. However, this is disadvantageous for the rest of the conveying pipes, since the air volume, and accordingly the air velocity, is reduced in the latter. The conveying of material becomes unstable in the loaded conveying pipe, and this can even cause backups of product and stoppage when the air system is designed poorly or in an excessively angular manner. The DE-PS No. 3 128 807 strives for a reliable operation without the need to design the ventilator of the conveying system for excess capacity. For this purpose it is suggested to provide every conveying pipe with a device for regulating the air flow, a detector arrangement for detecting the air through-flow and an actuator controlled by the detector arrangement of the respective device for regulating the air flow in order to maintain a constant air through-flow through the conveying pipes. The static pressure or a differential pressure is determined in the respective conveying pipe via the detector arrangement and is processed in an electronic control unit, specifically for forming control signals to the respective actuators for the devices for regulating the air flow in order to keep the air volume in every length of pipe at an allowable minimum.

However, the use, with respect to measurement techniques, of static air pressure in a conveying line with dust containing materials is problematic. There is a whole range of factors disrupting the direct dependence between "static air pressure" and "air volume". One of the chief factors leading to error is the respective specific constructional design of the flow cross section—shapes, surfaces, etc. In addition, the pressure values are considerably falsified by possible adhering dust to the point that the measured values are unusable. If the static pressure is determined via conventional pressure measuring devices, the corresponding signals likewise lose their informational value after a short time when there is dust containing air because of the stoppage of small measurement pipe cross sections.

The desire for accurately regulating and controlling the air volume with electronic computer devices accordingly turns out to be an illusion. In this instance, the electronic system makes the factual circumstances, simple in themselves, more complicated and complex. The goal of increasing the operating reliability is not achieved.

Recently, in many automating devices, as a second attempt at a solution, the problem has simply been circumvented in that, e.g. an individual blower is assigned to every conveying line. It would be conceivable to use very simple throttle flaps for a rough regulation of every conveying pipeline. For reasons relating to cost, such a solution is out of the question because of the very large number of individual pneumatic conveying pipelines in a mill. Moreover, the use of a plurality of ventilators, motors, etc. in turn jeopardizes the operating reliability as a result of the considerable increase in the number of the individual elements of the system caused by this.

Neither an increase in localized intelligence nor an elimination of a mutual collecting system for many pneumatic conveying lines has thus far yielded a satisfactory result in practice. The oldest and simplest concept of a control flap which is arranged in every conveying line so as to be movable can only be used in subordinate cases. In so doing, the control flap is moved into an opened position by means of a counterweight and into a more or less closed position depending on the intensity of the air flow. This differs from the closing flaps for ventilation systems which close without air flow and move into an open position by means of the air flow.

A somewhat improved construction for regulating the air volume in ventilating systems is described in the CH-PS No. 600 428. This proposed solution utilizes the dynamic air forces which act on the plane surfaces of a throttle flap, as well as a tightening torque and a correction signal for the respective desired balanced or opened position of the throttle flap, respectively, which correction signal corresponds to the desired magnitude of the air flow. The question of sensitivity to dust is also not answered in this case.

The object of the present invention is to reduce the disadvantages of the previous solutions and particularly to increase the operating reliability.

The solution, according to the invention, is characterized in that in the pneumatic conveying system, according to the generic type, every air volume regulating unit comprises a lifting body which is supported so as to be movable in a rotating manner and can be brought into a closed position from an open position as a throttle flap, wherein the lifting forces of the air flow are directed to the closed position and additional (mechanical) opening forces act at the lifting body.

Large-scale laboratory tests have shown a surprisingly precise functioning with the lowest possible consumption of air for the pneumatic conveying of the extremely simple device, but particularly without the use of complicated constructional elements which are sensitive to dust.

Third party participants skilled in the art had not thought this possible, especially since solutions have already been sought in vain since the beginning of pneumatic passage conveying in mills, that is, for approximately 40 years.

By means of suitable selection of the section of the lifting body, not only can the air volume be kept constant, but a positive effect can even be achieved to the extent that, e.g., a somewhat increased air volume is adjusted as the resistance in individual conveying lines increases, which is an additional advantage with respect to the stability of the pneumatic conveying.

The invention also permits various other preferred design ideas. Thus, the lifting body can be constructed in the manner of an airfoil section with a very rounded leading side and a pointed trailing end. This step in particular allows a positive air pressure/air volume ratio to be maintained in that e.g. the air volume is immediately increased when there is a tendency for the pneumatic conveying to fail.

The airfoil section is preferably curved on one side and substantially flat on the opposite side.

Another preferred design idea consists in that the lifting section comprises a notch on the pointed trailing side. An increase in responsiveness can accordingly be achieved in both the completely open and completely closed positions, since a slight unbalance of forces with respect to the center of rotation of the lifting body is obtained in this manner, even when the center of rotation is arranged approximately in the center of the lifting body.

In order for the air system to be accurately adjusted, but particularly so that corrections can also be made for subsequent changes, the mechanical opening forces are preferably adjustable and are formed by means of a spring force or a counterweight which exists e.g. in the lifting body or acts at the axis of rotation of the latter. It is advantageous, particularly for extreme closing positions, if the lifting body leaves open an air gap on the leading and trailing sides in the closed position.

In order to accurately regulate the air volume over a large area it is recommended to provide a necked-down portion in the air conveying line, wherein the lifting body is arranged in the area of the necked-down place.

The invention is directed, in addition, to a process for regulating the air velocity of a group of pneumatic air conveying pipelines which are connected to a mutual ventilator or a blower via a connecting pipe.

The new process is characterized in that the air velocity is controlled automatically be means of mechanically pneumatic forces, at least in the conveying pipelines with larger line cross sections, wherein the lifting forces of the air velocity regulating flap, which is constructed as lifting body, are used as a closing force which opposes a mechanical counterforce as opening force.

The lifting body preferably has an angle of incidence of approximately 20° in the completely open position and moves within the range of 20° and 90° for the purpose of regulating. At 90° the lifting body acts virtually as a closed flap; that is, it is in a fully transverse position relative to the air flow. Various tests have shown that the open position should be defined by means of a stop. For simple applications the stop can be adjusted to approximately 10° for the open position; preferably, it has a value of approximately 15° to 25°. However, for most cases a value of 20° was found to be optimal. Very strong lifting forces already occur at 20°, so that a high responsiveness occurs immediately, which can be decisive particularly when starting the system, that is, when starting the ventilation.

Every person skilled in the art of the technical control of air flow is sufficiently aware of the fact that the smallest changes, e.g. in an air measuring distance as a result of the occurrence of local uncontrollable turbulence can often so considerably falsify the results that the latter are unusable; that is, deviations are produced which can easily differ from the actual value by as much as 20% to 50% and more. Much practice and particularly the application of known rules relating to measuring technique is required in order to measure successfully. With the Prandtl's tube, slightly inclined positions of the pitot tube are already sufficient to cause measurement errors above the permissible tolerance. On the other hand, the expert knows some tricks for achieving his object.

The interrelationships e.g. in aircraft building are still more problematical, for example in designing the airfoil sections, the classic application of the lifting body. The airfoil section has a determined range for the angle of incidence in order to achieve optimal proportions for the lifting forces. If the selected angle of incidence is too great, the flow breaks down abruptly at the trailing side and also changes into a completely uncontrollable turbulence and the lifting forces collapse. In the normal subsonic range, angles of incidence up to a maximum of 20° are taken into account. In attempting to transfer these mathematical interrelationships, the very impossibility of doing so is immediately obvious. When the lifting body is used so as to function as a throttle flap, then, at least on first consideration, only a small adjusting area, but one which is virtually useless for air throttling, could be allowable in this instance as well. However, as already stated above with respect to the apparatus, measurements with the new air volume control have exactly the opposite results, namely a distinctly stable "air volume to pressure curve" until close to the closing point of the almost completely transverse position of the lifting body. In the case of the lifting body, this means that it can be used precisely in the area which lies outside the area of application of airfoils.

A sufficient explanation in practical terms could consist in that a lifting body behaves in an entirely different manner in a closed pipe system than the same section would behave in comparable velocity relationships in an airplane in the open air. To the knowledge of the present Applicant, this phenomenon has not been extensively explored or used in practice for regulating air volume.

The invention further concerns the use of a lifting body as throttle flap, which lifting body is movable in a rotating manner; particularly for regulating the air velocity in a pneumatic conveying system or an air dust-separation system, respectively.

The invention is explained in more detail in the following with the help of some embodiment examples.

Figure 1:
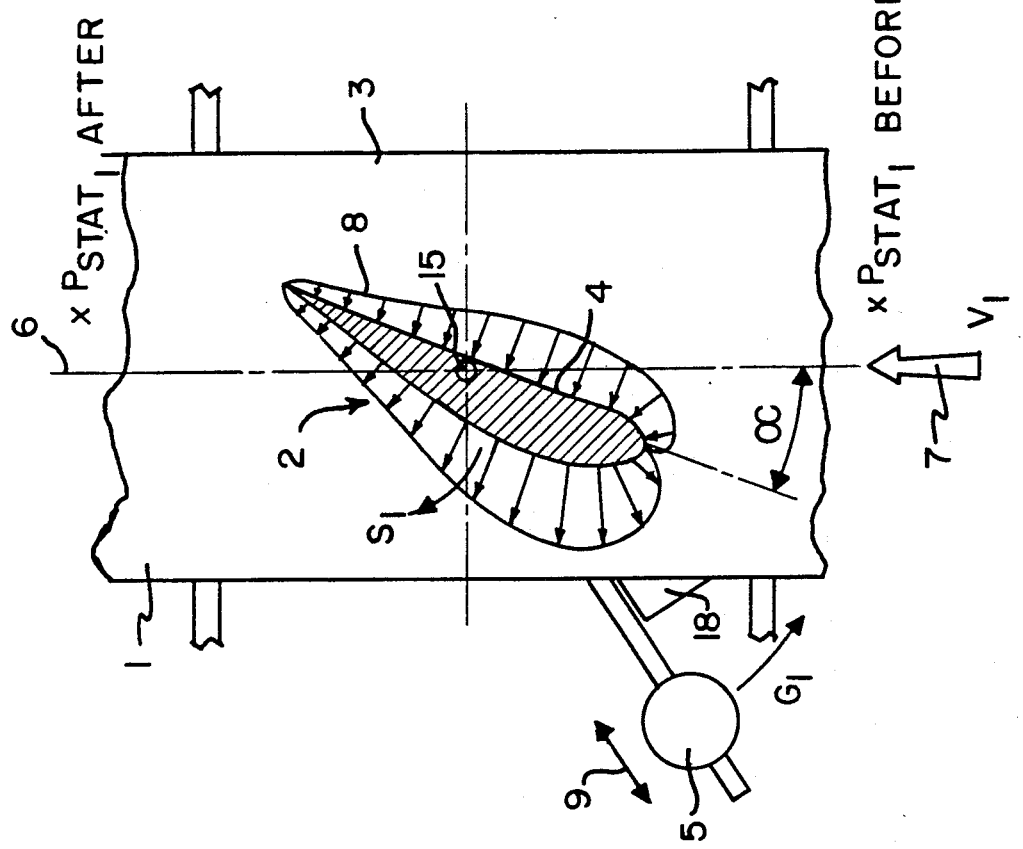
FIG. 1 shows a section through an air volume regulating unit in open position.

In FIG. 1, an air regulating unit 2 is installed in an air line 1 and comprises a pipe piece 3, a lifting body 4, which is supported so as to be swivelable around a swivel axle 15, and a counterweight 5. The pipe piece 3 can be constructed either as a normal pipe with a circular cross section or as one e.g. with a rectangular cross section. In the completely open position, the lifting body 4 is at an angle α of at least 10 degrees relative to the center axis 6 of the pipe piece 3 in such a way that a lifting force acting in every case as a closing force S is formed by means of the air flow, arrow 7. The closing force S is the mathematical resultant force from the sum of the lifting forces at the lifting body 4. A force field usual for an airfoil is shown only in a symbolic manner within an enveloping curve 8 with a plurality of single force vectors. The actual values of the force vectors are not determined. It is not to be ruled out that the actual force configuration is different, but not the resultant closing force S which is of primary interest. The weight G of the counterweight 5 now acts in the opposite direction to the closing force S. At constant air velocity, a balance is formed between two torques acting at the swivel axle 15, namely between the resultant closing torque brought about by the air forces S and the opening torque brought about by the weight G of the counterweight 5. The weight G can also be present in the lifting body 4.

Figure 2:
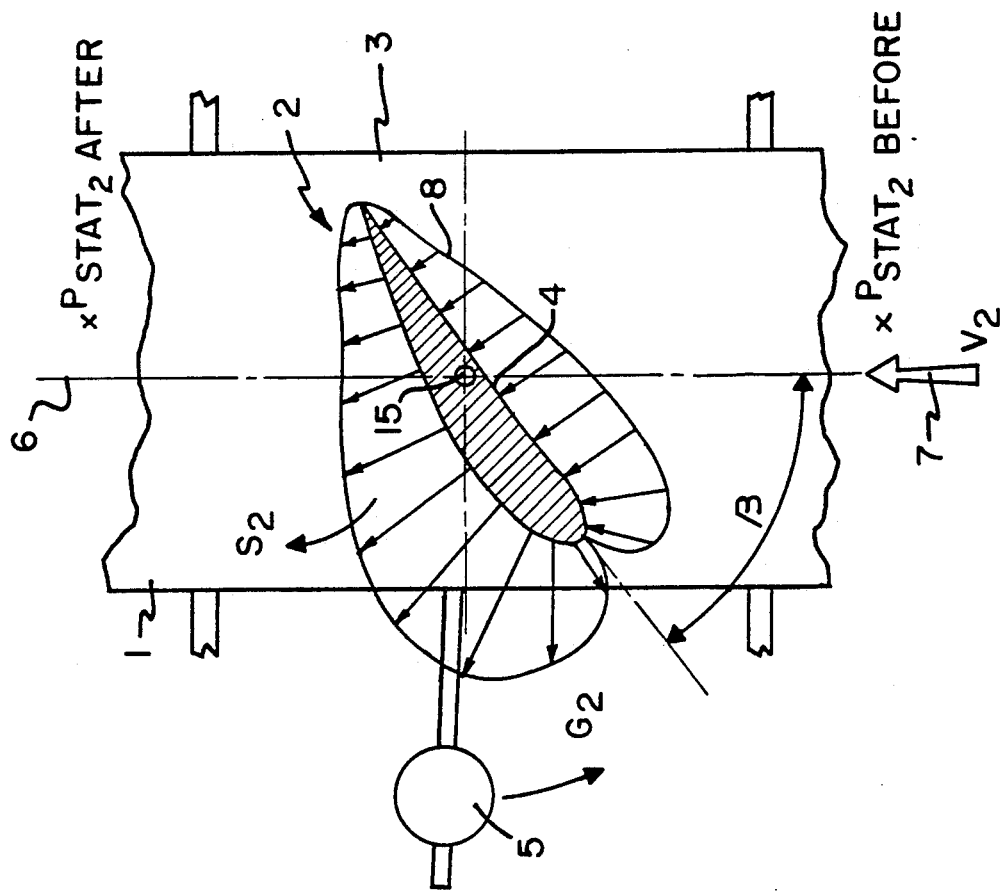
FIG. 2 shows the air volume regulating unit of FIG. 1 in half-closed position.

If the air velocity V increases from a value $V_1$ to the doubled value $V_2$ according to FIG. 2, the lifting forces S are immediately increased from $S_1$ to $S_2$. This results in a closing to approximately half the opening (angle β). The air velocity V, however, is increased in the remaining cross section. But the sum of all torques provides a new balance, so that the pressure difference between "Pstat$_1$ before" and "Pstat$_2$ before" is immediately balanced to the extent that the pressure differential in effect now adjusts a virtually identical air velocity $V_1 = V_2$ by means of the new, more closed position of the lifting body. In this way, the regulating unit actually regulates at an approximately constant air velocity.

The corresponding changes are effected in a fraction of a second, so that virtually no disturbance is determined for the air system as a result of the pressure change in an individual conveying line 1. This is also especially important for starting the ventilators.

Figure 3A:
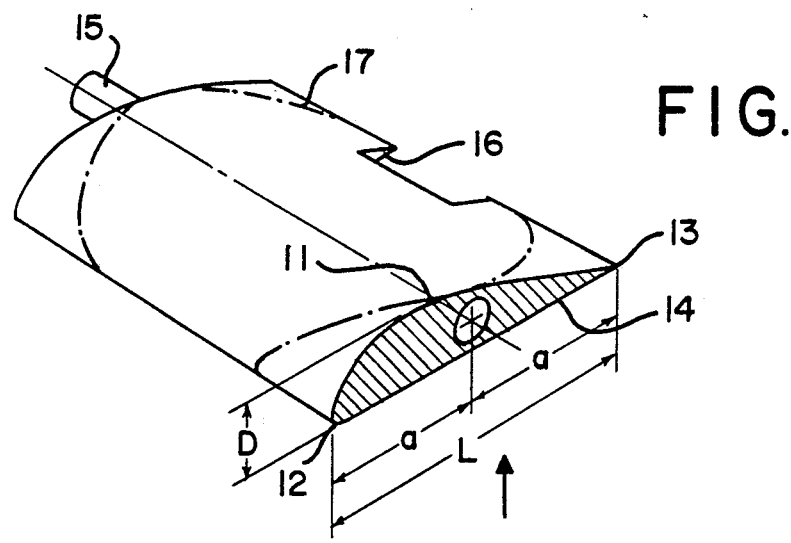
FIG. 3A is a perspective view of an air volume regulating unit according to FIGS. 1 and 2.
Figure 3B:
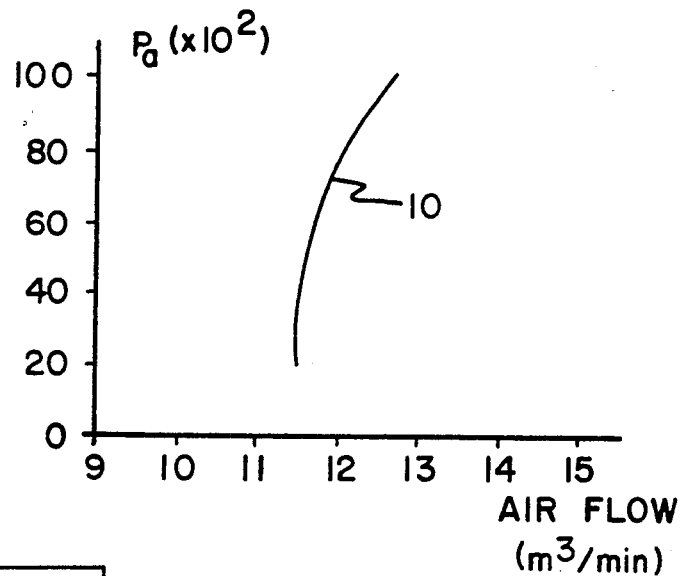
FIG. 3B shows the regulating behavior (pressure/air volume) of a section according to FIGS. 1 and 2.

The course of a measurement curve 10 describing the action of the lifting body 4, namely the relationship of pressure curve $P_d$ to the air flow m$^3$/min, is plotted in a schematic manner in FIG. 3B. The upper half of the drawing shows the lifting body 4. It is characteristic that the leading surface 12 is very rounded, whereas the trailing edge 13 has a pointed shape. The rounding of the leading edge results in a considerable thickness D of the section which can be approximately a fifth of the length L of the section. The underside 14 of the lifting body 4, i.e. its surface facing toward the arriving air flow, can be slightly inwardly rounded or also flat. The surface 11 of the lifting body 4 opposite it is rounded outward. The described shape has the advantage that dust or mealy particles adhere less easily to the surface.

The described airfoil section (FIG. 3A) has a center of rotation or swivel axle 15, respectively, which lies approximately in the center (a, a) with reference to the depth (L) of the section. As another special characteristic, the lifting body 4, according to FIG. 3B, has a notch 16 in the pointed trailing end 13 which has an unbalance for the air forces which benefits the closing forces S in the open position. This makes it possible to apply a heavier counterweight 5, which increases the opening forces. As a result, the lifting body 4 responds immediately in the closing direction from a completely open position and immediately in the opening direction from a completely closed position, as desired. A dash-dot line 17 indicates that the lifting body 4 is adaptable to any desired pipe or duct shape, round, oval, rectangular, etc.

However, in particular applications, e.g. especially large cross sections, it is possible to use two or more lifting bodies parallel to one another. The accuracy of the results is increased if a guide plate is arranged between every lifting body, so that every one can form its own duct flow.

Figure 4:
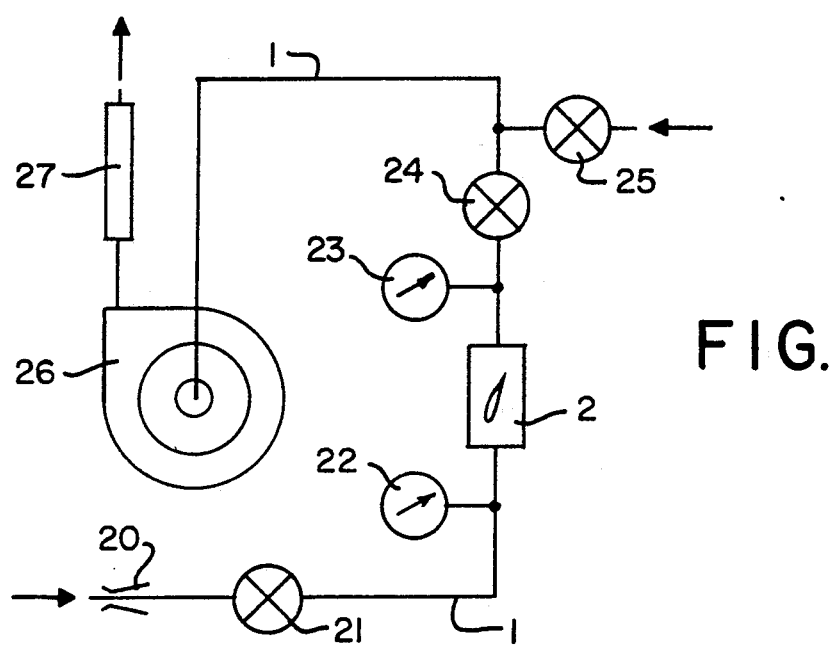
FIG. 4 shows a simple arrangement for the new air volume regulation.

A practical application of the new air regulation which is improved in the drawing as a test system is shown in FIG. 4. The inflowing air volume is measured by means of a Venturi tube 20. The conveying pressure can be adjusted to desired values via a conventional throttle 21. The static pressure is determined prior to the air regulating unit 2 by means of a manometer 22. Another manometer 23 measures the static pressure after the air regulating unit 2. A throttle 24 which can be adjusted in a standard manner is arranged subsequent to the latter. In order to simulate different air pressure conditions, an air inlet slide 25 is arranged between a ventilator 26 and the adjustable throttle 24. A sound damper 27 is provided after the ventilator 26. In a corresponding test arrangement, the operating reliability, as well as the effectiveness, was tested under all possible operating conditions and operating changes.

Figure 5:
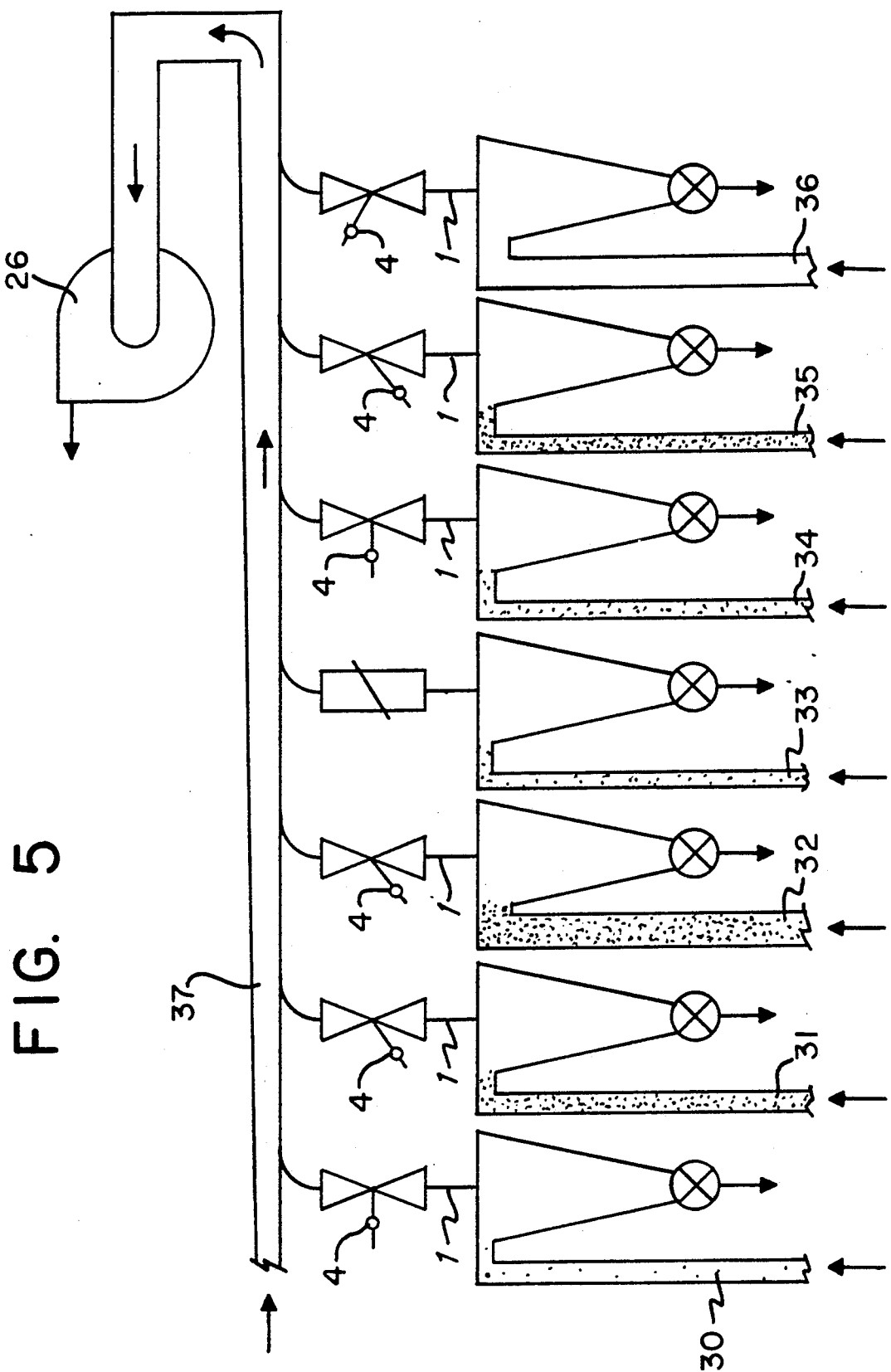
FIG. 5 shows a schematic view of the regulation of an entire pneumatic system in a mill.

The regulation of the air volume for a pneumatic system in a mill is shown in FIG. 5. The lines 30 to 36 are pneumatic product conveying pipes with various cross sections, as is conventional in practice.

The number of dots is supposed to indicate the presence of much, little or no product in the respective conveying line at the moment. If, for example, no product were being conveyed in the two largest conveying lines 32 and 36 and the air volume in the individual conveying pipelines were not regulated, the air velocity in these two lines would be extremely increased, that is, at the expense of the conveying lines 30, 31, 33, 34, 35 having small cross sections, and the conveying could collapse due to the absence of sufficient air velocity.

With the regulation, according to the invention, however, the air regulating unit closes up to a minimum value, which corresponds to the desired air volume, during the temporary halt of product conveying, e.g. in the conveying line 36. The respective position of the lifting body is shown symbolically corresponding to FIGS. 1 and 2 in all conveying lines by means of the inclined position of the counterweight.

As a result, the entire system is stabilized in this manner so that an approximately constant air volume is adjusted in the collecting line 37 in complete independence of the amount of product being conveyed in a given conveying line. In addition, it can be seen from FIG. 5 that no air regulating unit is provided e.g. for the small conveying line 33. This is easily permissible from the standpoint of both economic efficiency and operating reliability if the corresponding air volume only makes up perhaps 10 to 20% of the entire air volume. This may also be a matter of a product conduit in which products are conveyed, according to practice, which are very adhesive, e.g. very moist flours. There is a risk in this case of reducing the economic efficiency by not regulating the air volume or by means of selecting an air volume which is too great in every case, but the possibility of disturbance is ruled out in return.

I claim:

1. An air flow regulating unit including means for continuously automatically regulating the air volume in a pneumatic conveying system, said regulating means comprising:

a rotatable throttle member mounted for movement between open and closed and to intermediate positions, said throttle member being shaped as an airfoil so as to define lifting body means responsive to lifting forces acting on it directly for moving said throttle member towards said closed position; said throttle member further including biasing means providing a continuous counterforce to said lifting forces tending to move said throttle member towards said open position as said air flow urges said throttle member towards said closed position; said throttle member having a rounded leading end and a pointed trailing end and being positioned in its open position at an angle of at least 10 degrees relative to the direction of air flow, said throttle member moving between an angle of approximately 10 degrees in its open position to an angle of approximately 90 degrees in its closed position.

2. Air regulating unit according to claim 1, wherein the throttle member is substantially flat on a side facing the arriving air flow and curved on an opposite side.

3. Air regulating unit according to claim 1, wherein the counterforce is formed by means of one of an adjustable spring force, an adjustable counterweight and a weight in the throttle member.

4. Air regulating unit according to claim 1, wherein the throttle member leaves open an air gap on the leading and trailing ends in the closed position.

5. Air regulating unit according to claim 1, wherein the throttle member has a notch on the trailing end.

6. Air regulating unit according to claim 1, wherein the unit includes an air line having a necked-down portion, said throttle member being disposed in an area of said necked-down portion.

* * * * *